US008640251B1

(12) United States Patent  (10) Patent No.: US 8,640,251 B1
Lee et al.  (45) Date of Patent: Jan. 28, 2014

(54) METHODS AND SYSTEMS FOR CLASSIFYING COMPUTER DOCUMENTS INTO CONFIDENTIAL LEVELS USING LOG INFORMATION

(75) Inventors: Jianda Lee, San Jose, CA (US); Shuosen Robert Liu, Cupertino, CA (US)

(73) Assignee: Trend Micro Incorporated, Tokyo (JP)

( * ) Notice: Subject to any disclaimer, the term of this patent is extended or adjusted under 35 U.S.C. 154(b) by 134 days.

(21) Appl. No.: 13/325,661

(22) Filed: Dec. 14, 2011

(51) Int. Cl.
*H04L 29/06* (2006.01)

(52) U.S. Cl.
USPC ............. 726/26; 707/728; 707/752; 707/758; 707/781; 707/783; 707/784; 707/785; 707/786; 707/802; 707/803; 726/4; 726/5; 726/6; 726/7; 726/27; 726/28; 726/29; 709/201; 713/189

(58) Field of Classification Search
USPC ............. 707/2, 100, 200, 728, 752, 758, 781, 707/783–786, 802, 803; 726/4–7, 26–28; 709/201; 713/189; 705/1
See application file for complete search history.

(56) References Cited

U.S. PATENT DOCUMENTS

| | | | |
|---|---|---|---|
| 5,629,980 A | 5/1997 | Stefik et al. | |
| 5,781,550 A | 7/1998 | Templin et al. | |
| 5,884,025 A | 3/1999 | Baehr et al. | |
| 6,401,239 B1 | 6/2002 | Miron | |
| 6,606,744 B1 | 8/2003 | Mikurak | |
| 6,629,081 B1 | 9/2003 | Cornelius et al. | |
| 6,671,818 B1 | 12/2003 | Mikurak | |
| 6,751,600 B1 | 6/2004 | Wolin | |
| 6,963,973 B2 | 11/2005 | Chapman et al. | |
| 6,981,262 B1 | 12/2005 | DeMello et al. | |
| 7,042,470 B2 | 5/2006 | Rhoads et al. | |
| 7,127,741 B2 | 10/2006 | Bandini et al. | |
| 7,131,141 B1 | 10/2006 | Blewett et al. | |
| 7,152,046 B2 | 12/2006 | Wang et al. | |
| 7,298,864 B2 | 11/2007 | Jones | |
| 7,356,188 B2 | 4/2008 | Venkatesan et al. | |
| 7,574,449 B2 | 8/2009 | Majumder | |
| 7,624,435 B1 | 11/2009 | Huang | |
| 7,886,049 B2 | 2/2011 | Adelstein et al. | |
| 8,127,365 B1 * | 2/2012 | Liu et al. ......................... | 726/26 |
| 2002/0033844 A1 | 3/2002 | Levy et al. | |
| 2003/0005331 A1 | 1/2003 | Williams | |
| 2003/0065944 A1 | 4/2003 | Mao et al. | |
| 2004/0064537 A1 | 4/2004 | Anderson et al. | |
| 2004/0068543 A1 | 4/2004 | Seifert | |
| 2005/0066165 A1 | 3/2005 | Peled et al. | |
| 2005/0138353 A1 | 6/2005 | Spies et al. | |
| 2006/0155570 A1 * | 7/2006 | Almeida et al. .................. | 705/1 |
| 2006/0259948 A1 * | 11/2006 | Calow et al. ...................... | 726/1 |
| 2007/0260872 A1 | 11/2007 | Filipi-Martin et al. | |
| 2009/0292930 A1 * | 11/2009 | Marano et al. ................ | 713/189 |
| 2010/0146593 A1 * | 6/2010 | Stahl et al. ........................ | 726/4 |

* cited by examiner

*Primary Examiner* — Jeffrey Pwu
*Assistant Examiner* — Hee Song
(74) *Attorney, Agent, or Firm* — Okamoto & Benedicto LLP (57) ABSTRACT

Files of computer documents are classified into confidential levels without extracting and analyzing contents of the files. Files created by particular users may be clustered into groups of files based on file characteristics, such as file type (e.g., file extension) and file naming convention. A prediction confidential score may be generated for each group of files. A log of a file retention resource may be consulted to identify files created by users. A file created by a user may be assigned a prediction confidential score of a group of files having the same file characteristic as the file and created by the same user. The prediction confidential score may be used to determine a confidential level of the file when the file is found to be inaccessible.

9 Claims, 5 Drawing Sheets

METHODS AND SYSTEMS FOR CLASSIFYING COMPUTER DOCUMENTS INTO CONFIDENTIAL LEVELS USING LOG INFORMATION

BACKGROUND OF THE INVENTION

1. Field of the Invention

The present invention relates generally to computer security, and more particularly but not exclusively to methods and systems for classifying computer documents.

2. Description of the Background Art

Computer documents, such as files, may be classified to control access to them. Existing techniques for classifying computer documents typically require having access to the contents of the documents. For example, a file may be classified by extracting the contents of the file and assigning a confidential level to the file based on its contents. While, feasible, this approach is unworkable in situations where the content of the document cannot be accessed for some reason. For example, privacy concerns or network restrictions may prevent access to documents that need to be classified. Embodiments of the present invention pertain to methods and systems for classifying documents without necessarily having to access the contents of the documents.

SUMMARY

In one embodiment, a method of classifying computer documents into confidential levels comprises clustering files of computer documents created by a user into different groups of files based on characteristics of the files, generating a prediction confidential score for each group of files, the prediction confidential score being a prediction for the likelihood of confidentiality that the user may possess for the group of files based on characteristics of files in the group of files, consulting a log of a file retention resource to identify a first file created by the user and having a same characteristic as files in a first of group of files created by the user, the first file being stored in the file retention resource, assigning a prediction confidential score of the first group of files to the first file, and when the first file is found to be inaccessible, determining a confidential level of the first file using the prediction confidential score without analyzing a content of the first file.

In another embodiment, a method of classifying computer documents into confidential levels comprises clustering files of documents created by users into different groups of files based on characteristics of the files, generating a prediction confidential score for each groups of files of each user, consulting a file transaction log to create connection graphs identifying users who sent or received files to or from other users, identifying a first unknown user having no associated confidential level downloading a first file, in response to identifying the first unknown user, determining a confidential level of the first file without analyzing a content of the first file by using a first prediction confidential score of a first group of files of a second user who uploaded the first file, the first group of files of the second user and the first file having a same file characteristic.

In another embodiment, a method of classifying computer documents into confidential levels comprises clustering files of documents created by users into different groups of files based on characteristics of the files, generating a prediction confidential score for each groups of files of each user, consulting a file transaction log to create connection graphs identifying users who sent or received files to or from other users, identifying a first unknown user having no associated confidential level who uploaded a first file, and in response to identifying the first unknown user, determining a confidential level of the first file without analyzing a content of the first file by using a first prediction confidential score of a first group of files of a second user who downloaded the first file, the first group of files of the second user and the first file having a same file characteristic.

In another embodiment, a method classifying computer documents into confidential levels comprises consulting a log to obtain filenames with full folder paths of files of documents, obtaining confidential scores of files indicated in the log, clustering confidential scores into groups based on characteristics of files indicated in the log, and determining a confidential level of a file without analyzing a content of the file using a representative value of confidential scores of other files having a same file characteristic and stored in a same full folder path as the file.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
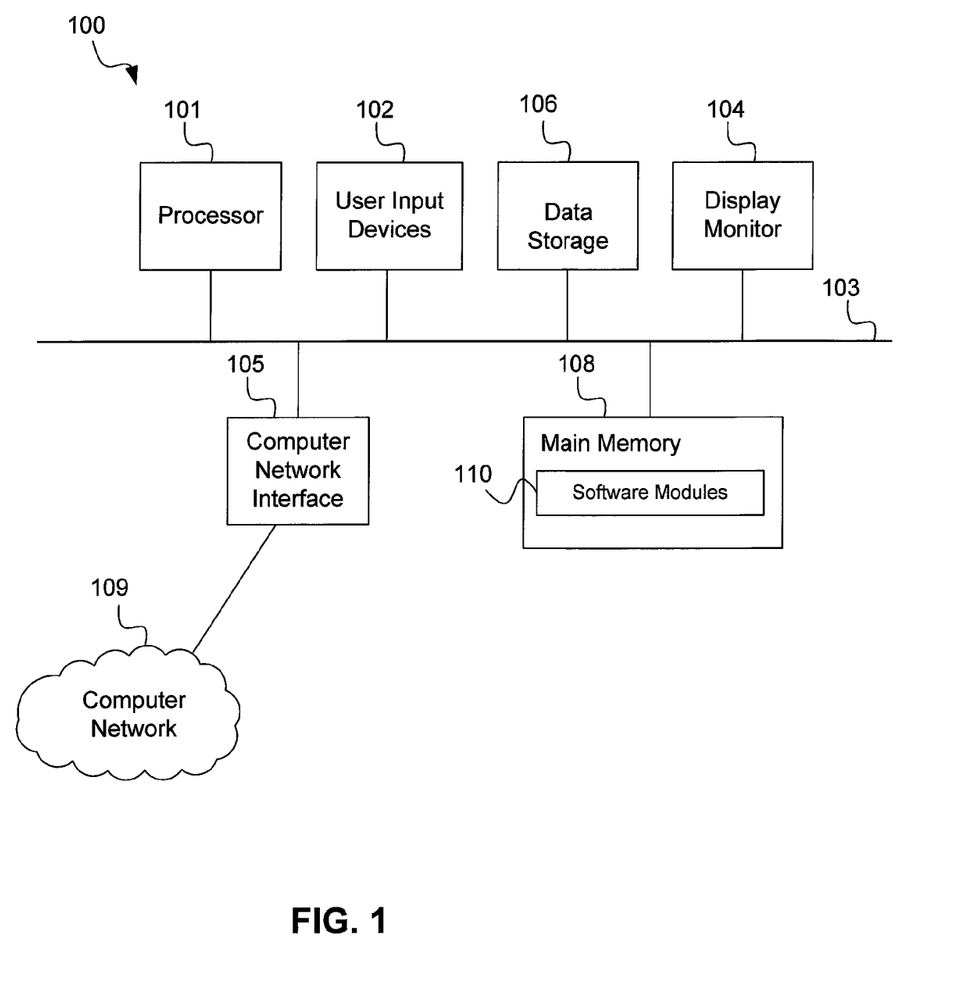
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as any of the computing devices disclosed below. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available in other computer-readable medium including optical disk, flash drive, and other memory devices.

Figure 2:
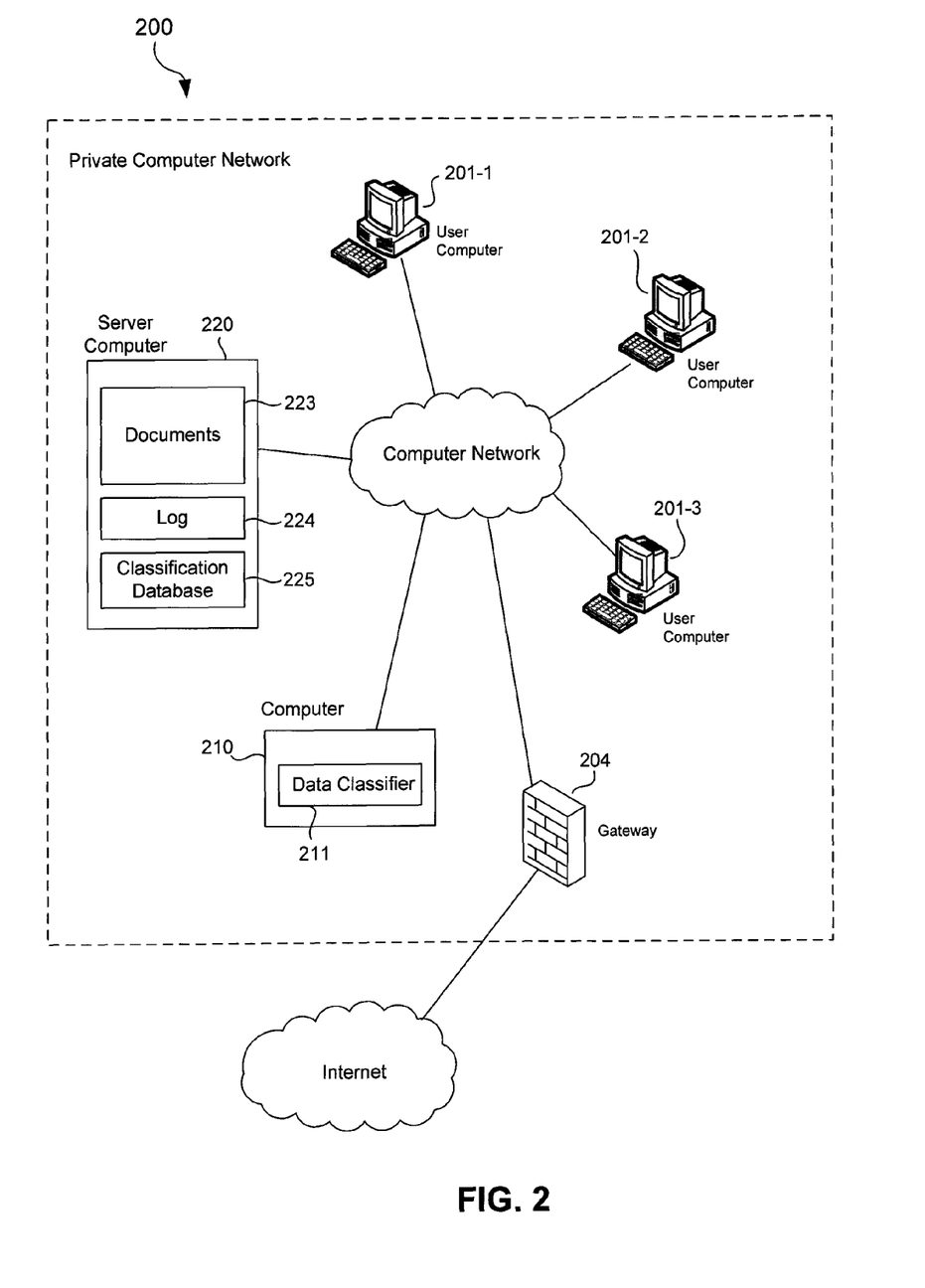
FIG. 2 shows a schematic diagram of a system for classifying computer documents into confidential levels in accordance with an embodiment of the present invention.

FIG. 2 shows a schematic diagram of a system 200 for classifying computer documents into confidential levels in accordance with an embodiment of the present invention. The system 200 may be deployed in a private computer network, for example. The system 200 may include a plurality of user computers 201 (i.e., 201-1, 201-2, 201-3, ... ), a computer 210, and a server computer 220 that communicate over a computer network. A gateway 204 couples the computers in the private computer network to the Internet. The gateway 204 may be configured to screen computer documents passing through the gateway 204 by confidential level. For example, the gateway 204 may be configured to prevent a user computer 201 to send a document classified at a certain confidential level from being sent to another computer on the Internet.

A user computer 201 may comprise a desktop computer, a laptop computer, or other computing device employed by a user to create, send (e.g., upload), and/or receive (e.g., download) documents 223.

The server computer 220 may comprise a server computer or other computing device for centralized storage of the computer documents 223. In the example of FIG. 2, the server computer 220 comprises the documents 223, one or more logs 224, and a classification database 225. The server computer 220 may comprise an iShare server, web server, email server, FTP (file transfer protocol) server, file server, or a network storage device, for example. The documents 223 may comprise executable files, word processing files, email files, source code files, etc. A user may employ a user computer 201 to upload and download documents 223 to and from the server computer 220. The server computer 220 may be configured as an intermediary node through which documents 223 are transmitted over the computer network. In general, the server computer 220 may be configured as a file retention resource.

A log 224 may comprise an access log, file transaction log, folder log, or some other event or historical record of a file retention resource, such as the server computer 220.

The classification database 225 may comprise a database, a table, or some other listing indicating a confidential level and/or confidential score of a document 223. In one embodiment, a document 223 may have a confidential level of either "confidential" or "public." Access to a confidential document 223 may be limited to users within the private computer network or to specified individuals. A public document 223 may be freely accessed by anyone. In other embodiments, a document 223 may be classified with more levels, such as "top-secret," "confidential," "private," and "public." The number of confidential levels depends on the particular application.

The computer 210 may comprise a server computer, a desktop computer, or some other computing device configured to classify the documents 223. In the example of FIG. 2, the computer 210 includes a data classifier 211. The data classifier 211 may comprise computer-readable program code configured to classify a document 223 that is not accessible for classification. For example, a document 223 may be encrypted, inaccessible due to packet-sniffing or remote scan, etc. preventing analysis of the contents of the document 223. In one embodiment, the data classifier 211 employs a heuristic algorithm to assign a confidential score to an inaccessible document 223 based on information from the log 224 regarding other documents 223, without extracting and analyzing the contents of the inaccessible document 223. The confidential score may be derived from the user who created the inaccessible document 223, social interaction of users sending and/or receiving the inaccessible document 223, or the folder where the inaccessible document 223 is stored. A document 223 may be assigned a confidential level based on its confidential score. For example, a document 223 having a confidential score equal to or higher than a threshold may be classified as confidential, whereas a document 223 having a confidential score lower than the threshold may be classified as public.

In the example of FIG. 2, the log 224 and the classification database 225 are hosted on the server computer 220, and the data classifier 211 is hosted on the computer 210. However, this is not necessarily the case as the aforementioned components may be hosted on the same computer, in separate computers, or some combination. For example, the data classifier 211 may be running on the server computer 220 along with the log 224 and the classification database 225.

Embodiments of the present invention may leverage existing document classification techniques to determine confidential scores of accessible documents 223, i.e., documents 223 which contents can be extracted and analyzed. Accessible documents 223 may be obtained by traversing file-system, crawling remote systems (or the web), extraction from network payload, hooking file I/O drivers, or some other means of obtaining a document. The contents of accessible documents 223 may then be analyzed to calculate their individual confidential scores. For example, the contents of accessible documents 223 may be extracted into various kinds of metadata including confidential level or score, keywords or patterns in a filename or file naming convention (e.g., project names), user (e.g., creator, owner), file types/extensions (e.g., word processing document, source code), content type (e.g., newsletter, sales report, finance report, design documents). These document classification techniques are not applicable to inaccessible documents 223 because they require extraction and analysis of the contents of the document being classified. However, as will be more apparent below, embodiments of the present invention may leverage these techniques in conjunction with logs to assign a confidential score, and hence a classification level, to an inaccessible document 223.

Figure 3:
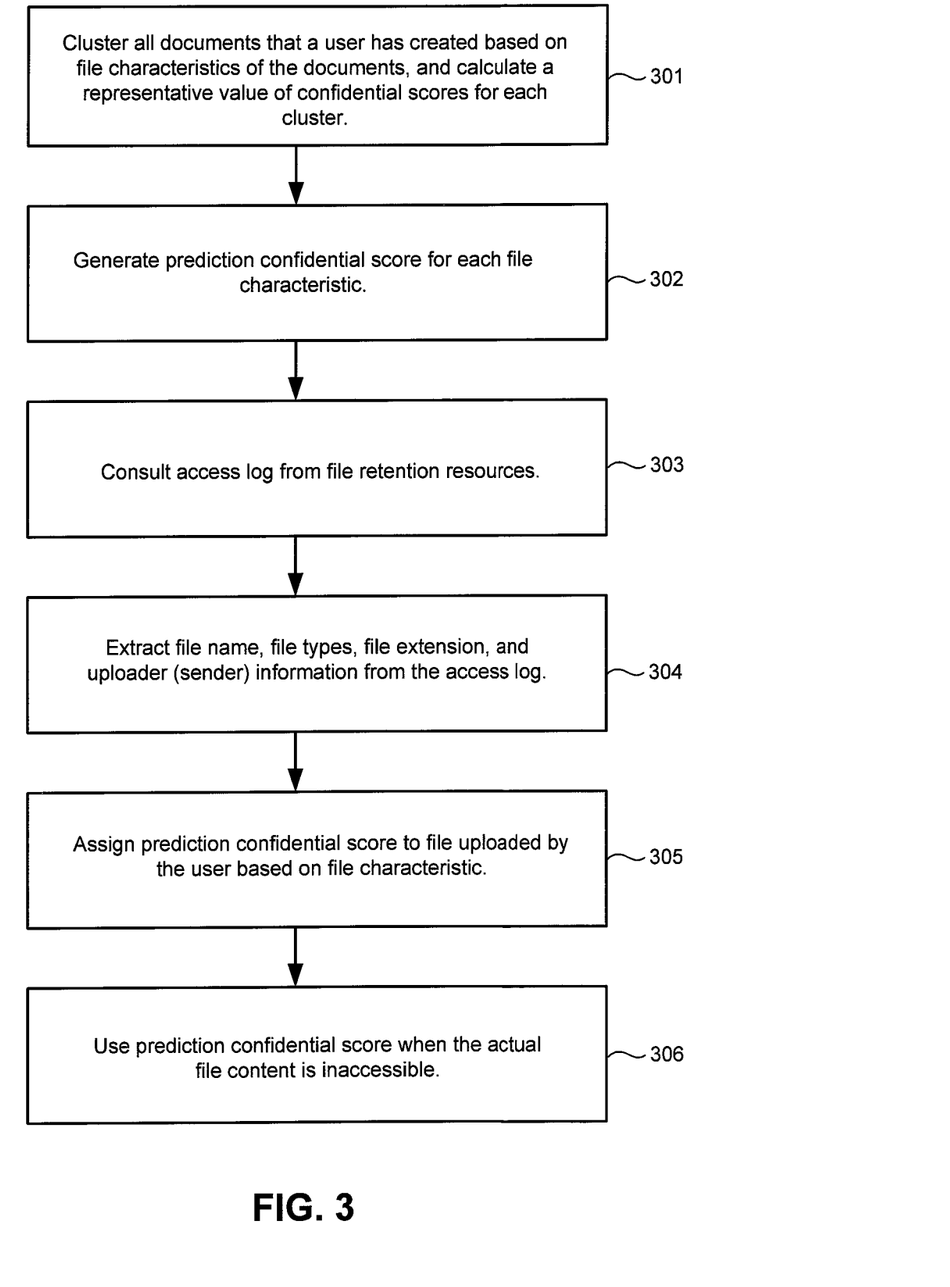
FIG. 3 shows a flow diagram of a method of classifying computer documents into confidential levels in accordance with another embodiment of the present invention.

FIG. 3 shows a flow diagram of a method of classifying computer documents into confidential levels in accordance with an embodiment of the present invention. The method of FIG. 3 may be performed in whole or in part by the data classifier 211 to classify an inaccessible document 223 based on its creator, which in one embodiment may be deemed as the user who uploaded the inaccessible document 223.

The method of FIG. 3 includes a preparation phase and an action phase. The preparation phase, which comprises steps 301 and 302, involves generation of prediction confidential scores based on file characteristics of other documents 223 created by the same user and have already been classified. The action phase, which comprises steps 303-306, uses information from the preparation phase to classify inaccessible documents 223.

In the preparation phase, all documents that a user has created are clustered based on file characteristics, such file types and keywords from file naming conventions, and the representative value of confidential scores for each cluster is calculated (step 301). In one embodiment, the representative value is the mean value of confidential scores of documents in the same cluster. For example, all documents that a user has created and have already been classified may be obtained. These classified documents may be clustered based on their characteristics, such as file types (e.g., from their extension) and file naming convention. As a particular example, files with ".exe" extension may be grouped together separate from other files, and files having a file name including "_projectX" may be grouped together separate from other files. The mean value of confidential scores of all files in a particular group may be calculated.

A prediction confidential score may be assigned for each file characteristic, such as for each file type and file naming convention (step 302). As its name implies, the prediction confidential score is a prediction for the likelihood of confidentiality that the user may possess for each file type and file naming convention. In one embodiment, the prediction confidential score for a file type or file naming convention is the representative value of the file type or file naming convention, which in this embodiment is the mean value of all classified files having the same file type or file naming convention created by the user. As a particular example, a prediction confidential score for a file created by a user having a file type with ".exe" extension is the mean value of confidential scores of all files created by the same user and also having the ".exe" extension. Similarly, a prediction confidential score for a file created by the user having a file naming convention that includes "_projectX" is the mean value of confidential scores of all files created by the same user and having a file name that includes "_projectX". In addition to generating a prediction confidential score for each file type and file naming convention, an overall confidential score may also be calculated for the user. The overall confidential score may be the mean value of confidential scores of all files created by the user.

In the action phase, access logs of file retention resources, such iShare, web, email, FTP, and file servers (step 303) are consulted to obtain user access information. For example, the filename, file types, and uploader (i.e., user who uploaded the file) information are extracted from the access log (step 304). In this case, the uploader of a file may be deemed as the user who created the file. The prediction confidential score for each file type and file naming convention generated in the preparation phase for a particular user is assigned to files having the same characteristic (e.g., file type and file naming convention) uploaded by the same user (step 305). When a file in the file retention resource needs to be classified but is detected to be somehow inaccessible, the prediction confidential score may be used to classify the file (step 306), at least as an initial classification. The file is preferably classified based on analysis of its content as soon as the file becomes accessible.

As a particular example, a log 224 may indicate access information on documents 223 stored in the server computer 220. The data classifier 211 may consult the classification database 225 for all classified documents 223 created by a particular user. The data classifier 211 may cluster all classified documents 223 created by the particular user by type or naming convention, and calculate the mean value of confidential scores for each type or naming convention. The mean value for a type or naming convention may be assigned as the prediction confidential score for documents 223 of the same type and naming convention by the particular user. The data classifier 211 may consult the log 224 to extract the type, name, and uploader of the documents 223 stored in the server computer 220. The data classifier 211 may assign the prediction confidential scores by type and naming convention to all documents 223 uploaded by the user as discovered from the log 224. When a document 223 uploaded by the particular user needs to be classified but is somehow inaccessible, the data classifier 211 may assign a corresponding prediction confidential score to the inaccessible document 223 based on its type or naming convention. As can be appreciated, this allows the inaccessible document 223 to be classified without extracting and analyzing the content of the inaccessible document 223.

Figure 4:
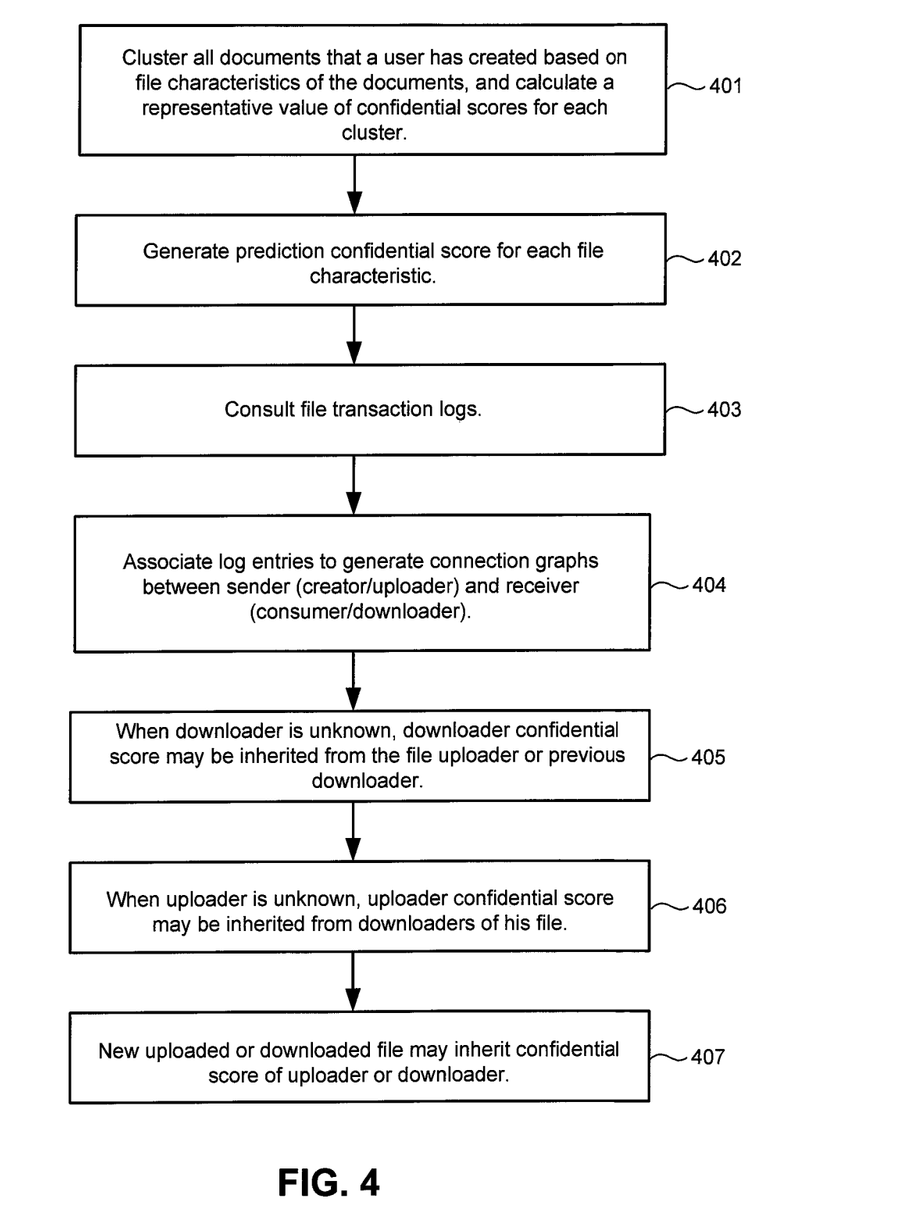
FIG. 4 shows a flow diagram of a method of classifying computer documents into confidential levels accordance with another embodiment of the present invention.

FIG. 4 shows a flow diagram of a method of classifying computer documents into confidential levels in accordance with an embodiment of the present invention. The method of FIG. 4 may be performed in whole or in part by the data classifier 211 to classify an inaccessible document 223 based on social interaction of users sending and/or receiving the inaccessible document 223.

The method of FIG. 4 includes a preparation phase and an action phase. The preparation phase, which comprises steps 401-404, allows for generation of prediction confidential scores based on file characteristics of classified documents 223 created by a user, which may be a sender or receiver, and connection graphs between users. The action phase, which comprises steps 405-406, uses information from the preparation phase to classify inaccessible documents 223.

In the preparation phase, all documents that a user has created are clustered based on file characteristics (e.g., by file type or file naming convention), and a representative (e.g., mean) value of confidential scores for each cluster is calculated (step 401). A prediction confidential score is then assigned for each file characteristic, such as for each file type and file naming convention (step 402). These two steps are similar to the first two steps of the method of FIG. 3.

Still in the preparation phase, file transaction logs of file retention resources (step 403), such as iShare, web, email, FTP, and file servers, are consulted to obtain transaction information. For example, entries in the file transaction logs are associated to generate connection graphs between sender (uploader/creator) and receiver (downloader/consumer) (step 404). As a particular example, the mapping of a user sending a particular file and another user receiving the particular file is created based on information from the file transaction logs. Multiple parsing of multiple entries of logs may be performed to discover all mappings of sender-receiver pairs.

In the action phase, when an unknown user, i.e., a user with no associated confidential level, wants to download an inaccessible file (e.g., the file is encrypted and thus cannot be classified), the file's confidential score may be inherited from the user who uploaded the file or a user who has previously downloaded the file (step 405). More specifically, the prediction confidential score for the file type or file naming convention of the user who uploaded the file may be assigned to the inaccessible file.

When an unknown user uploads a file that is found to be inaccessible, the file's confidential score may be inherited from other users who downloaded the inaccessible file (step 406). More specifically, the prediction confidential score for the file type or file naming convention of a user who downloaded the file may be assigned to the inaccessible file. When there are more than one user who downloaded the file, the mean value of prediction confidential scores for the same file type or file naming convention of all users who downloaded the file may be assigned as the confidential score of the inaccessible file.

When the file transaction log indicates that a new file is uploaded or downloaded, the file's confidential score may be inherited from either the user who uploaded the file or the user who downloaded the file (step 407) by file type or file naming convention as before. In general, the combination of the steps of the method of FIG. 4 allows a new user or new file to have an initial confidential score without the need to extract and analyze file content.

As a particular example, a log 224 may indicate information on documents 223 stored in the server computer 220. The data classifier 211 may consult the classification database 225 for all classified documents 223 created by a particular user. The data classifier 211 may cluster all classified documents 223 created by the particular user by type or naming convention, and calculate the mean value of confidential scores for each type or naming convention. The mean value for a type or naming convention may be assigned as the prediction confidential score for documents 223 of the same type or naming convention by the particular user. The log 224 may also indicate transactions, e.g., file transfers, performed on documents 223 stored in the server computer 220. The data classifier 211 may obtain a copy of the log 224, and extract information from the log 224 to create a mapping of users sending or receiving documents 223. A user may be identified by his or her user name, IP address of the computer 201 the user is using, etc. The mapping may indicate user associations, such as sender-receiver pairs for particular documents 223. For example, a mapping may indicate that a user employing the user computer 201-1 sent a document 223 to another user employing the user computer 201-2, or vice versa. When an unknown user downloads an inaccessible document 223, the inaccessible document 223 may inherit the prediction confidential score by file type or file naming convention of the user who uploaded the inaccessible document 223. When an unknown user uploads an inaccessible document 223, the inaccessible document 223 may inherit the prediction confidential score by file type or file naming convention of another user who downloaded the inaccessible document 223. When a new document has been uploaded or downloaded, that new document may inherit the prediction confidential score by file type or file naming convention of the user who either downloaded or uploaded the new document.

Figure 5:
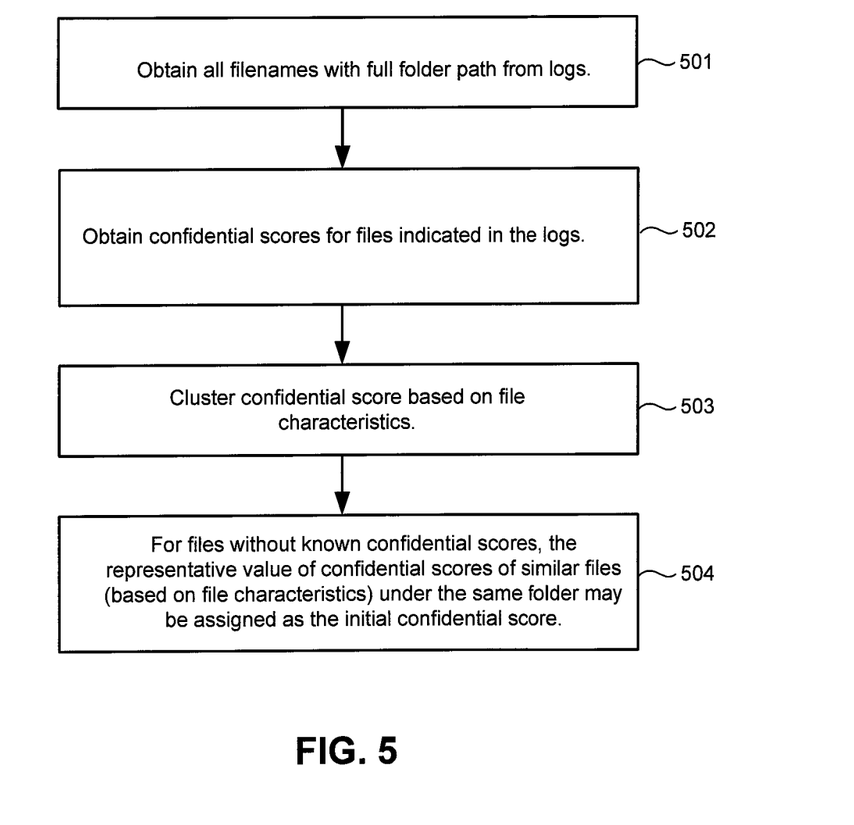
FIG. 5 shows a flow diagram of a method of classifying computer documents into confidential levels in accordance with another embodiment of the present invention.

FIG. 5 shows a flow diagram of a method of classifying computer documents into confidential levels in accordance with an embodiment of the present invention. The method of FIG. 5 may be performed in whole or in part by the data classifier 211 to classify an inaccessible document 223 based on the folder where the inaccessible document 223 is stored.

The method of FIG. 5 includes a preparation phase and an action phase. The preparation phase, which comprises steps 501-503, involves generation of prediction confidential scores based on confidential scores of classified documents 223 in the same full folder path as the inaccessible document 223 being classified. The action phase, which comprises step 504, uses information from the preparation phase to classify the inaccessible document 223.

In the preparation phase, all file names with full folder path from logs are obtained (step 501). Confidential scores of files indicated in the log are obtained (step 502) to the extent possible. It is to be noted that some files indicated in the logs may not be classified, and accordingly have no confidential scores. These files are preferably classified to obtain confidential scores to the extent possible, e.g., by using conventional content-based classification techniques. Files that are inaccessible may be classified later on in the action phase based on its folder. As can be appreciated, inaccessible files may also be classified based on their creator or social interaction as previously described. Confidential scores are clustered into groups of confidential scores based on file characteristic, such as file type, file naming convention, folder prefix, file extension, filename prefix/keyword/pattern. (step 503). For example, confidential scores obtained per the steps above may be grouped together based on the file type or file naming convention of their corresponding files.

In the action phase, the representative (e.g., mean) value of the confidential scores from similar files based on file characteristic (e.g., file extension or file naming convention) under the same folder as an inaccessible file may be assigned as the prediction confidential score of the inaccessible file (step 504). For example, an inaccessible file having a file name of "top_projectX.exe" and a full folder path of "c:\documents\secretproject\top_projectX.exe" may be assigned an initial confidential score equal to the mean value of all files having an extension of ".exe" in the same full folder path. As can be appreciated this assignment of confidential score may be performed based on log or file listing without the need to access and analyze the actual file content. The just described technique may also be formed on other "folder" concept or file storage hierarchy, such as a blogging thread, an iShare folder, records in the same database schema table, or files included in a project file.

As a particular example, the data classifier 211 may obtain file names with full folder paths from the log 224. The data classifier 211 may obtain the confidential scores of files of documents 223 indicated in the log 224 from the classification database 225 when available or using conventional content-based data classification techniques for accessible files. When files are found to be inaccessible, the inaccessible files may be assigned confidential scores based on their creator or social interaction as previously described, or later on in the process based on their full folder paths. The data classifier 211 may cluster the confidential scores based on file type or file naming convention. For files without known confidential scores, the data classifier 211 may assign a confidential score equal to the mean value of confidential scores of similar files in the same full folder path.

Table 1 illustrates an example data structure that may be employed by the data classifier 211 to keep track of user confidential scores that may be employed in classifying inaccessible documents.

TABLE 1

| User | | | |
|---|---|---|---|
| UserA | Overall score | | 9 (the score to be applied when no breakdown is possible) |
| | Folder Prefix | URL | Confidential Score |
| | URL | http://ishare/doc/projectX/ | 10 |
| | | C:\my document\ | 8 |
| | | ftp://1.2.3.4/userA/doc/ | 5 |
| | File Extension | Ext | Confidential Score |
| | | ppt | 8 |
| | | doc | 9 |
| | | Cad | 7 |
| | Prefix/keyword of filename | Keyword | Confidential Score |
| | | project | 9 |
| | | IDF | 10 |
| | | HLD | 9 |
| | User Network | User | Confidential Score |
| | | UserA-UserB | 10 |
| | | UserA-UserZ | 9 |

TABLE 1-continued

| User |
| --- |
| UserB |
| UserC |

In the example of Table 1, a first user, UserA, has an overall confidential score of 9, which is the score applied when finer classification is somehow not possible. The user also has corresponding confidential scores based on folder and URL, file extension, prefix/keyword of a filename, and user network. Confidential scores of other users may also be included in the data structure. Table 1 is just an example; other data structures may also be employed to keep track of user confidential scores.

As can be appreciated from the foregoing, embodiments of the present invention allow for classification of a document without extracting and analyzing the contents of the document. This advantageously allows for classification of inaccessible documents using log information.

While specific embodiments of the present invention have been provided, it is to be understood that these embodiments are for illustration purposes and not limiting.

For example, although the embodiments are described in the context of logs, the embodiments may also be implemented by obtaining user, filename, and folder information from other mediums, such as from packet sniffing of LIST command from the POP3 protocol, from HTTP tags in HTTP headers, or from HTML source code from remote web servers. As another example, the embodiments are described in the context of user identity. However, the same embodiments may use source IP (Internet protocol) address and destination IP address from network connection logs, where user identity may be omitted. This allows establishing reputation of networking nodes (client or server). Many additional embodiments will be apparent to persons of ordinary skill in the art reading this disclosure.

What is claimed is:

1. A method of classifying computer documents into confidential levels, the method comprising:
    clustering files of documents created by users into different groups of files based on characteristics of the files;
    generating a prediction confidential score for each group of files of each user;
    consulting a file transaction log to create connection graphs identifying users who sent or received files to or from other users;
    identifying a first unknown user having no associated confidential level downloading a first file;
    in response to identifying the first unknown user, determining a confidential level of the first file without analyzing a content of the first file by using a first prediction confidential score of a first group of files of a second user who uploaded the first file, the first group of files of the second user and the first file having a same file characteristic;
    identifying a third unknown user having no associated confidential level who uploaded a second file; and
    in response to identifying the third unknown user, determining a confidential level of the second file without analyzing a content of the second file by using a second prediction confidential score of a second group of files of a fourth user who downloaded the second file, the second group of files of the fourth user and the second file having same file characteristic.

2. The method of claim 1 wherein the first file and files in the first group of files have a same file extension.

3. The method of claim 1 wherein the first file and files in the first group of files have a same file naming convention.

4. A method of classifying computer documents into confidential levels, the method comprising:
    clustering files of documents created by users into different groups of files based on characteristics of the files;
    generating a prediction confidential score for each group of files of each user;
    consulting a file transaction log to create connection graphs identifying users who sent or received files to or from other users;
    identifying a first unknown user having no associated confidential level who uploaded a first file; and
    in response to identifying the first unknown user, determining a confidential level of the first file without analyzing a content of the first file by using a first prediction confidential score of a first group of files of a second user who downloaded the first file, the first group of files of the second user and the first file having a same file characteristic.

5. The method of claim 4 wherein the first file and files in the first group of files have a same file extension.

6. The method of claim 4 wherein the first file and files in the first group of files have a same file naming convention.

7. A method of classifying computer documents into confidential levels, the method comprising:
    clustering files of documents created by users into different groups of files based on characteristics of the files;
    generating a prediction confidential score for each group of files of each user;
    consulting a file transaction log to create connection graphs identifying users who sent or received files to or from other users;
    identifying a first unknown user having no associated confidential level downloading a first file;
    in response to identifying the first unknown user, determining a confidential level of the first file without analyzing a content of the first file by using a first prediction confidential score of a first group of files of a second user who uploaded the first file, the first group of files of the second user and the first file having a same file characteristic;
    identifying a third file that is newly uploaded or downloaded; and
    determining a confidential level of the third file without analyzing a content of the third file by using a prediction confidential score of another group of files of either a fifth user who uploaded the third file or a sixth user who downloaded the third file.

8. The method of claim 7 wherein the first file and files in the first group of files have a same file extension.

9. The method of claim 7 wherein the first file and files in the first group of files have a same file naming convention.

* * * * *